(12) United States Patent
Kim

(10) Patent No.: US 11,260,645 B2
(45) Date of Patent: Mar. 1, 2022

(54) METHOD FOR MANUFACTURING PACKAGING SHEET

(71) Applicant: Ho Chil Kim, Iksan-si (KR)

(72) Inventor: Ho Chil Kim, Iksan-si (KR)

( * ) Notice: Subject to any disclaimer, the term of this patent is extended or adjusted under 35 U.S.C. 154(b) by 32 days.

(21) Appl. No.: 16/638,687

(22) PCT Filed: Aug. 17, 2018

(86) PCT No.: PCT/KR2018/009443
§ 371 (c)(1),
(2) Date: Feb. 12, 2020

(87) PCT Pub. No.: WO2019/039796
PCT Pub. Date: Feb. 28, 2019

(65) Prior Publication Data
US 2021/0187931 A1 Jun. 24, 2021

(30) Foreign Application Priority Data
Aug. 22, 2017 (KR) .......................... 10-2017-0105944

(51) Int. Cl.
| B32B 38/00 | (2006.01) |
|---|---|
| B32B 3/00 | (2006.01) |
| B32B 7/00 | (2019.01) |
| B32B 37/00 | (2006.01) |
| B65D 65/00 | (2006.01) |
| B32B 38/04 | (2006.01) |
| B32B 3/30 | (2006.01) |
| B32B 7/12 | (2006.01) |
| B32B 37/12 | (2006.01) |

(Continued)

(52) U.S. Cl.
CPC ............... *B32B 38/04* (2013.01); *B32B 3/30* (2013.01); *B32B 7/12* (2013.01); *B32B 37/12* (2013.01); *B65D 65/40* (2013.01); *B32B 3/28* (2013.01); *B32B 38/06* (2013.01); *B32B 2038/047* (2013.01); *B32B 2307/304* (2013.01); *B32B 2553/00* (2013.01); *Y10T 156/102* (2015.01); *Y10T 156/1018* (2015.01); *Y10T 156/1023* (2015.01); *Y10T 156/1056* (2015.01); *Y10T 156/1057* (2015.01)

(58) Field of Classification Search
CPC ... B32B 2038/047; B32B 38/04; B32B 38/06; B32B 3/28; B32B 3/30; B32B 7/12; B32B 37/12; B29C 2793/0018; B29C 2793/0045
See application file for complete search history.

(56) References Cited

U.S. PATENT DOCUMENTS 3,044,921 A * 7/1962 Wentworth ............ B21D 47/00
156/205

FOREIGN PATENT DOCUMENTS

| JP | 2000-326430 A | 11/2000 |
|---|---|---|
| JP | 2009-535240 A | 10/2009 |

(Continued)

*Primary Examiner* — Linda L Gray
(74) *Attorney, Agent, or Firm* — Novick, Kim & Lee, PLLC; Jae Youn Kim

(57) ABSTRACT

A method of manufacturing a packaging sheet, the method being capable of not only greatly improving a heat insulation property of the packaging sheet, but also minimizing the volume of cells of the packaging sheet without opening the cells by cutting or needle-punching the cells, thereby facilitating storage and transportation of the packaging sheets while significantly reducing logistics costs.

7 Claims, 11 Drawing Sheets

(51) Int. Cl.
  *B65D 65/40*   (2006.01)
  *B32B 3/28*   (2006.01)
  *B32B 38/06*   (2006.01)

(56) References Cited

FOREIGN PATENT DOCUMENTS

| | | | |
|---|---|---|---|
| JP | 2011-025979 | A | 2/2011 |
| JP | 2016-177117 | A | 10/2016 |
| KR | 10-1416337 | B1 | 7/2014 |
| KR | 10-1880399 | B1 | 7/2018 |

\* cited by examiner

FIG. 3A
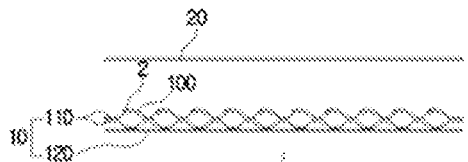
FIG. 3B
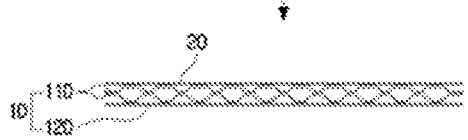
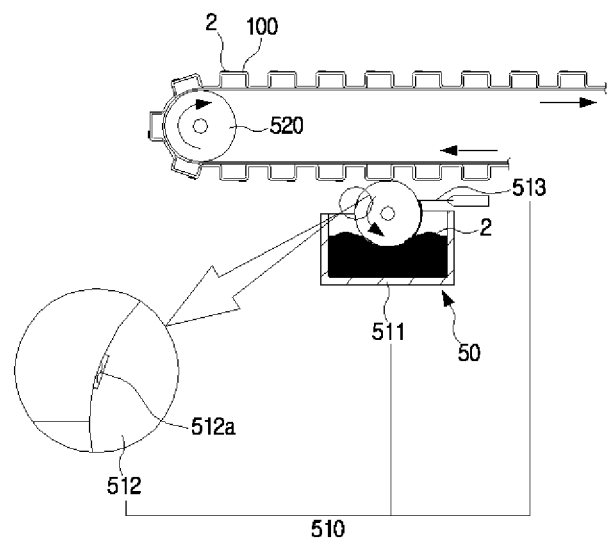
FIG. 4

METHOD FOR MANUFACTURING PACKAGING SHEET

TECHNICAL FIELD

The present invention relates to a method of manufacturing a packaging sheet, the method being capable of not only greatly improving a heat insulation property of the packaging sheet, but also minimizing the volume of cells of the packaging sheet without opening the cells by cutting or needle-punching the cells, thereby facilitating storage and transportation of the packaging sheets while significantly reducing logistics costs.

BACKGROUND ART

In general, packaging materials are used not only to enhance the appearance of packed goods, but also to protect the packaged goods against external impacts. In particular, in packaging of electrical and electronic products or automobile parts such as, bumpers, fenders, doors, and the like, a first foaming paper sheet or an air cap wrapping sheet is generally used to separate the electrical and electronic parts and the automobile parts from an inner surface of a box wall inside of a paper box such that an impact force which may be externally applied to packed goods is absorbed and alleviated.

In the case of the air cap wrapping sheet, there is a problem in that the volume of air caps is inevitably large due to the air caps sealed in units of cells, causing an excessive increase in logistics costs such as transportation costs.

Meanwhile, in an effort to solve such a problem, the present applicant has proposed methods of manufacturing a packaging sheet having improved heat insulation and storage properties, which can greatly reduce logistics costs by minimizing volume during storage and transportation, as well as greatly improve a heat insulation property. These methods disclosed in Korean Patent No. 10-1752100 (hereinafter referred to as "Patent Document 1"), Korean Patent No. 10-1752101 (hereinafter referred to as "Patent Document 2"), and Korean Patent Application No. 10-2016-0117724 (hereinafter referred to as "Patent Document 3").

However, in the case of Patent Documents 1 and 2, there is a problem in that one side of a packaging sheet has to be cut in order to discharge fluid in the packaging sheet to the outside to minimize the volume of the packaging sheet, and this is a cumbersome work. In addition, Patent Document 3 also has a problem in that a part of a packaging sheet has to be cut or needle-punched in order to minimize the volume of the packaging sheet.

DISCLOSURE

Technical Problem

Accordingly, the present invention has been made keeping in mind the above problems occurring in the related art, and an objective of the present invention is to provide a method of manufacturing a packaging sheet, the method being capable of not only greatly improving a heat insulation property of the packaging sheet, but also minimizing the volume of cells of the packaging sheet without opening the cells by cutting or needle-punching the cells, thereby facilitating storage and transportation of the packaging sheets while significantly reducing logistics costs.

Technical Solution

In order to accomplish the above objective, the present invention provides a method of manufacturing a packaging sheet, the method including: a) perforating each of a plurality of cells of a cell sheet in which the plurality of cells are formed at a regular interval; and b) partially bonding a finishing sheet onto the plurality of cells of the cell sheet.

Furthermore, the present invention may provide a method of manufacturing a packaging sheet, the method including: a) perforating each of a plurality of cells of each of first and second cell sheets, each of the first and second cell sheets in which the plurality of cells are formed at a regular interval; and b) partially bonding the first and second cell sheets to each other.

Herein, the method may further include: c) winding the cell sheet on an outer surface of a winding roller in a roll type.

The method may further include: c) winding the first and second cell sheets on an outer surface of a winding roller in a roll type.

Furthermore, the cell sheet in the step a) may be comprised of: a formed film in which the plurality of cells are formed at a regular interval; and a lower-side film bonded to a lower side of the formed film.

Alternatively, the cell sheet in the step a) may be comprised of: a formed film formed in such a manner that two films overlap each other in an up-and-down direction such that the plurality of cells is formed between the two films; and a lower-side film bonded to a lower side of the formed film.

Furthermore, each of the first and second cell sheets in the step a) may be comprised of: a formed film in which the plurality of cells are formed at a regular interval; and a lower-side film bonded to a lower side of the formed film.

Alternatively, the first cell sheet in the step a) may be comprised of: a formed film in which the plurality of cells are formed at a regular interval; and a lower-side film bonded to a lower side of the formed film, and the second cell sheet may be comprised of: a formed film in which the plurality of cells are formed at a regular interval; and a lower-side film and an upper-side film that are bonded onto a lower side of the formed film and onto the plurality of cells of the formed film, respectively.

Alternatively, each of the first and second cell sheets in the step a) may be comprised of: a formed film in which the plurality of cells are formed at a regular interval; and a lower-side film and an upper-side film that are bonded onto a lower side of the formed film and onto the plurality of cells of the formed film, respectively.

Furthermore, the step a) may include: $a_1$) applying an adhesive to a part of each of the plurality of cells; and $a_2$) perforating a part of each of the plurality of cells where the adhesive is not applied.

Furthermore, the step $a_2$) may be performed by perforating each of the plurality of cells through a perforating unit, the perforating unit including: a rotary roller; and needle bars that are formed on an outer surface of the rotary roller at a regular interval and each of which perforates the part of each of the plurality of cells where the adhesive is not applied while rotating together with the rotary roller.

Alternatively, step $a_2$) may be performed by perforating each of the plurality of cells through a perforating unit, the perforating unit including: a needle bar perforating the part of each of the plurality of cells where the adhesive is not applied; and a driving source for lifting the needle bar.

Furthermore, the step b) may be performed by allowing the cell sheet and the finishing sheet to pass through a pair of rotary rollers so that the cell sheet and the finishing sheet may be partially bonded to each other while the cell sheet and the finishing sheet are compressed.

Alternatively, the step b) may be performed by allowing the first and second cell sheets to pass through a pair of rotary rollers so that the first and second cell sheets may be partially bonded to each other while the first and second cell sheets are compressed.

Advantageous Effects

The present invention can not only greatly improve a heat insulation property of a packaging sheet, but also minimize the volume of cells of the packaging sheet without opening the cells by cutting or needle-punching the cells, thereby facilitating storage and transportation of the packaging sheets while significantly reducing logistics costs.

DESCRIPTION OF DRAWINGS

FIGS. 3A-3B are front views schematically illustrating another example of a cell sheet of the first embodiment.

FIG. 4 is a front view schematically illustrating a process of applying an adhesive to a plurality of cells of the first embodiment.

BEST MODE

Hereinafter, exemplary embodiments of the present invention will be described in detail with reference to the accompanying drawings. Of course, the scope of the present invention is not limited to the following embodiments, and various modifications can be made by those skilled in the art without departing from the technical gist of the present invention.

Figure 1:
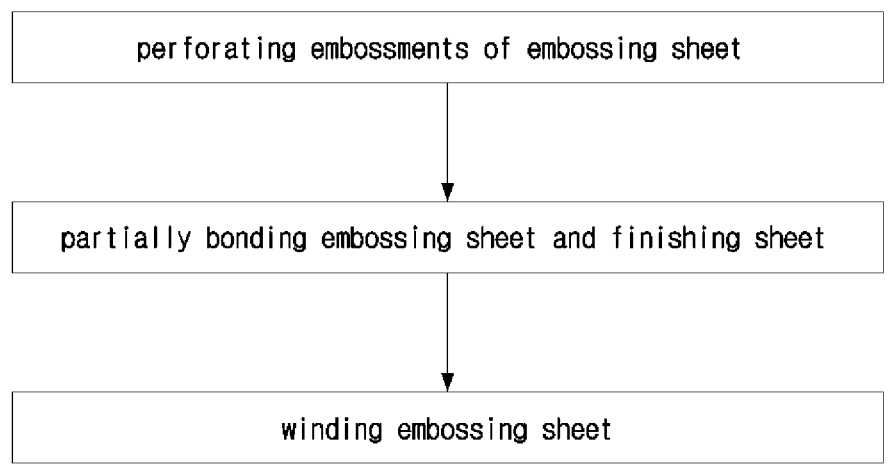
FIG. 1 is a block diagram schematically illustrating a method of manufacturing a packaging sheet according to a first embodiment of the present invention.
Figure 2A:
FIGS. 2A-2D are front views schematically illustrating a process of the method of manufacturing the packaging sheet according to the first embodiment of the present invention.
Figure 2B:
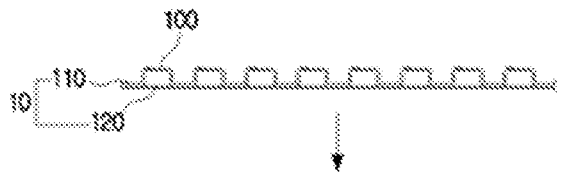
Figure 2C:
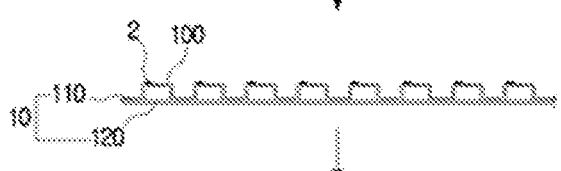
Figure 2D:
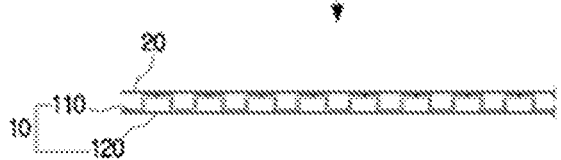

FIG. 1 is a block diagram schematically illustrating a method of manufacturing a packaging sheet according to a first embodiment of the present invention, and FIGS. 2A and 2D are front views schematically illustrating a process of the method of manufacturing the packaging sheet according to the first embodiment of the present invention.

As illustrated in FIGS. 1 and 2, the method of manufacturing the packaging sheet according to the first embodiment of the present invention largely includes: a) step of perforating a cell of a cell sheet (hereinafter referred to as "step a)"); and b) step of partially bonding the cell sheet and a finishing sheet (hereinafter referred to as "step b)").

First, the step a) of the first embodiment is a step of perforating each of a plurality of cells 100 of a cell sheet 10 in which the plurality of cells 100 are formed at a regular interval.

In one example, the cell sheet 10 of the step a) of the first embodiment may be largely, as illustrated in FIGS. 2A and 2D, comprised of a formed film 110 and a lower-side film 120 and may be wound on a cell sheet winding roller (not illustrated) in a roll type.

The formed film 110 may have the plurality of cells 100 arranged in a matrix form at a regular interval.

The lower-side film 120 may be bonded to a lower side of the formed film 110 in various methods such as fusing or adhesion.

FIGS. 3A and 3B are front views schematically illustrating another example of the cell sheet of the first embodiment.

In another example, the cell sheet 10 in the step a) of the first embodiment may be, as illustrated in FIGS. 3A and 3B, comprised of the formed film 110 and the lower-side film 120. Herein, the formed film 110 may be formed by bonding two films in various methods such as fusing or adhesion in a state in which the two films overlap each other in an up-and-down direction, such that a plurality of cells 100 is formed between the two films.

The lower-side film 120 may be bonded to lower sides of the plurality of cells 100 of the formed film 110 in various methods such as fusing or adhesion.

Figure 5:
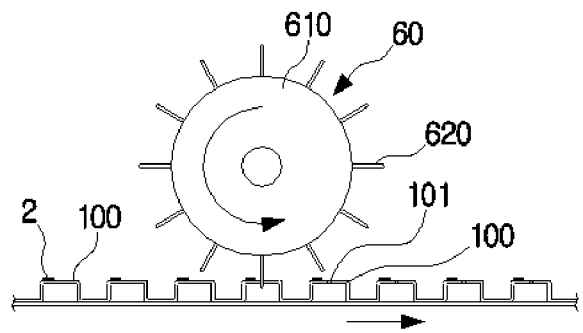
FIGS. 5 and 6 are front views schematically illustrating a process of perforating the plurality of cells of the first embodiment.
Figure 6:
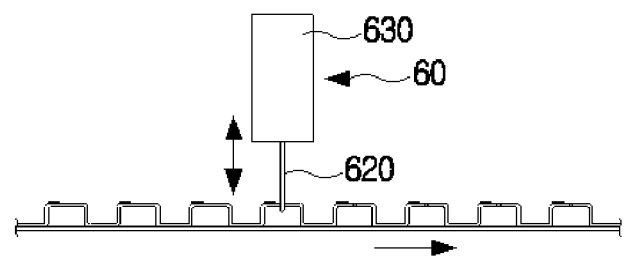

FIG. 4 is a front view schematically illustrating a process of applying an adhesive to the plurality of cells of the first embodiment, and FIGS. 5 and 6 are front views schematically illustrating a process of perforating the plurality of cells of the first embodiment.

In an example, the step a) may be comprised of an adhesive applying step (hereinafter referred to as "step $a_1$)") and a perforating step (hereinafter referred to as "step $a_2$)").

As illustrated in FIGS. 2 to 6, the step $a_1$) of the first embodiment is a step of applying an adhesive 2 to the plurality of cells 100 through an adhesive applying unit 50.

The adhesive applying unit 50 may be comprised of, for example, an adhesive applying unit 510 and a guide roller 520.

As illustrated in FIG. 4, the adhesive applying unit 510 may largely include an adhesive container 511, an adhesive transfer roller 512, and a blade 513 and may apply the adhesive 2 to a part of each of the plurality of cells 100, for example, to one side of an upper portion or the other side of the upper portion of each of the plurality of cells 100.

The adhesive 2 may be accommodated at a predetermined height inside the adhesive container 511.

The adhesive transfer roller 512 may be shafted to an inner upper side of the adhesive container 511 in a state in which a lower portion of the adhesive transfer roller 512 is immersed in the adhesive 2 accommodated in the adhesive container 511.

An upper portion of the adhesive transfer roller 512 may come into contact with the plurality of cells 100 of the cell sheet 10 that is unwound from the cell sheet winding roller (not illustrated).

The adhesive transfer roller 512 may include a plurality of receiving grooves 512a formed in an outer surface thereof at a predetermined interval in a matrix form and in which a part of the adhesive 2 accommodated in the adhesive container 511 is accommodated.

The blade 513 may be in contact with the outer surface of the adhesive transfer roller 512 to remove the adhesive 2 that remains on the outer surface of the adhesive transfer roller 512.

As illustrated in FIG. 4, the cell sheet 10 may be moved in a direction from an upper portion to a lower portion of the guide roller 520 through the guide roller 520 in a state in which the cell sheet 10 slides over one side of the guide roller 520.

In another example, although not illustrated in the drawings, the adhesive applying unit 50 may be configured as various types, such as may be configured as an automatic adhesive applying device provided with an adhesive spray nozzle for spraying the adhesive 2 to a part of each of the plurality of cells 100, for example, to the one side of the upper portion or the other side of the upper portion of each of the plurality of cells 100.

Next, as illustrated in FIGS. 5 and 6, the step $a_2$) of the first embodiment is a step of perforating a part of each of the plurality of cells 100 where the adhesive 2 is not applied, through a perforating unit 60 to form holes 101 in the plurality of cells 100.

In one example, as illustrated in FIG. 5, the perforating unit 60 may include a rotary roller 610 and needle bars 620.

The rotary roller 610 may be located above the cell sheet 10.

The needle bars 620 may be formed on an outer surface of the rotary roller 610 at a predetermined interval to rotate together with the rotary roller 610 while perforating a part of each of the plurality of cells 100 the adhesive 2 is not applied, for example, an upper central portion of each of the plurality of cells 100.

In another example, as illustrated in FIG. 6, the perforating unit 60 may configured as various types, such as to include a needle bar 620 and a driving source 630 for lifting the needle bar 620.

Figure 7:
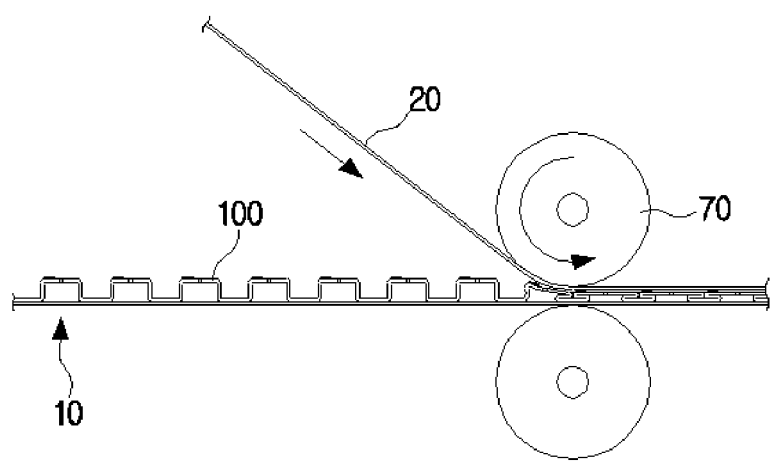
FIG. 7 is a front view schematically illustrating a process of partially bonding a finishing sheet on the plurality of cells of the first embodiment.

FIG. 7 is a front view schematically illustrating a process of partially bonding the finishing sheet on the plurality of cells of the first embodiment.

Next, as illustrated in FIGS. 2 and 7, step b) of the first embodiment is a step of partially bonding the finishing sheet 20 to upper portions of the plurality of cells 100 of the cell sheet 10.

The finishing sheet 20 may be wound on a finishing sheet winding roller (not illustrated) in a roll type.

In one example, as illustrated in FIG. 7, in the step b), the finishing sheet 20 unwound from the finishing sheet winding roller (not illustrated) and the cell sheet 10 may pass through a pair of rotary rollers 70 so that the finishing sheet and the cell sheet may be partially bonded to each other while being compressed. Herein, the volume of the cells 100 may be minimized as gas present inside the cells 100 leaks outwardly of the cell sheet 10. Due thereto, there is no need to open the cells 100 by cutting or needle-punching the cells 100 to minimize the volume of the cells 100.

Figure 8:
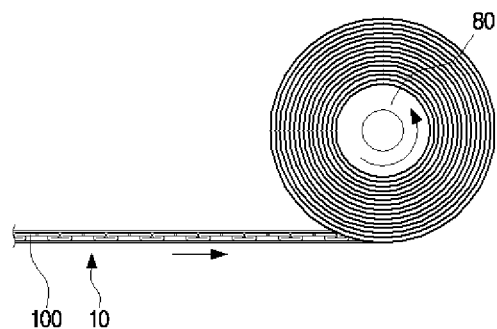
FIG. 8 is a front view schematically illustrating a process in which the cell sheet of the first embodiment is wound on an outer surface of a winding roller.

FIG. 8 is a front view schematically illustrating a process in which the cell sheet of the first embodiment is wound on an outer surface of a winding roller.

Next, the present invention may further include a winding step (hereinafter referred to as "step c)") for winding the cell sheet 10 with the volume of the cells 100 minimized on an outer surface of a winding roller 80.

As illustrated in FIG. 8, the cell sheet 10 in the step c) of the first embodiment may be transported and stored in a state of being wound on the outer surface of the winding roller 80 in a roll type so that logistics costs can be significantly reduced.

Figure 9:
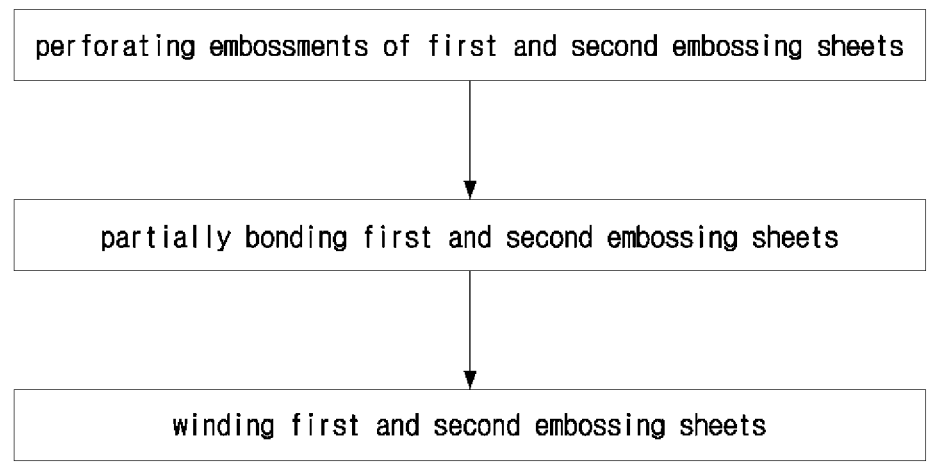
FIG. 9 is a block diagram schematically illustrating a method of manufacturing a packaging sheet according to a second embodiment of the present invention.
Figure 10A:
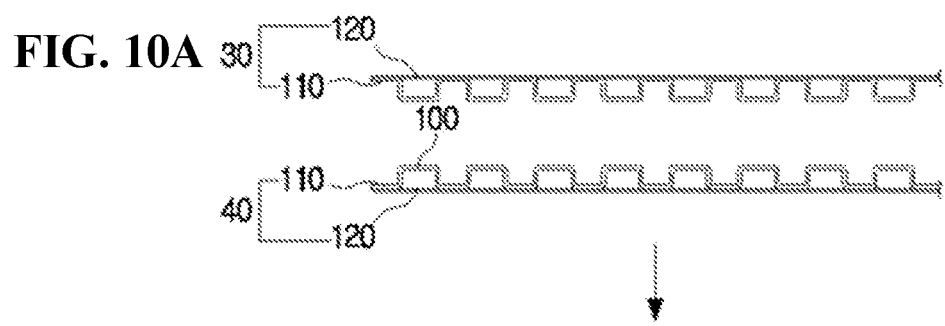
FIGS. 10A-10D are front views schematically illustrating a process of the method of manufacturing the packaging sheet according to the second embodiment of the present invention.
Figure 10B:
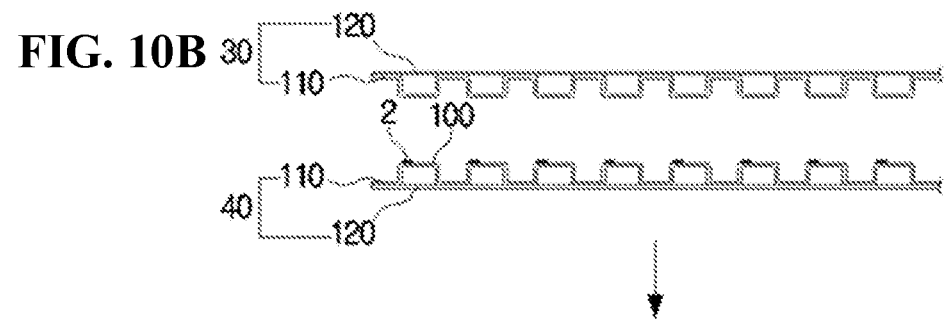
Figure 10C:
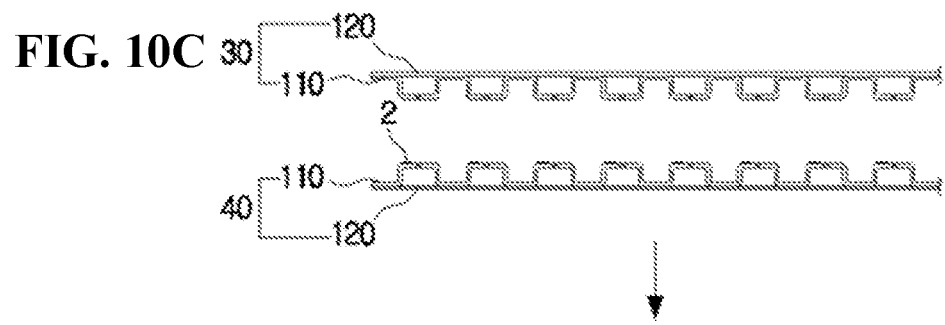
Figure 10D:
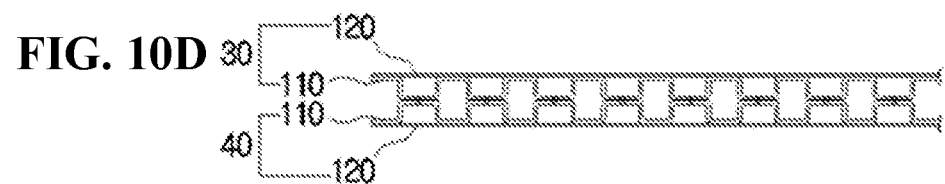

FIG. 9 is a block diagram schematically illustrating a method of manufacturing a packaging sheet according to a second embodiment of the present invention, and FIGS. 10A-10D are front views schematically illustrating a process of the method of manufacturing the packaging sheet according to the second embodiment of the present invention.

Next, as illustrated in FIGS. 9 and 10A-10D, the method of manufacturing the packaging sheet according to the second embodiment of the present invention largely includes: a) step of perforating cells of first and second cell sheets (hereinafter referred to as "step a)"); and b) step of partially bonding the first and second cell sheet and a finishing sheet (hereinafter referred to as "step b)").

The step a) of the first embodiment is a step of perforating each of a plurality of cells 100 of each of first and second cell sheets 30 and 40, each of the first and second cell sheets in which the plurality of cells 100 are formed at a regular interval.

In the step a) of the second embodiment, the first and second cell sheets 30 and 40 may be unwound from a first cell sheet winding roller (not illustrated) and a second cell sheet winding roller (not illustrated), respectively, in a state of being wound on the first cell sheet winding roller (not illustrated) and the second cell sheet winding roller (not illustrated), respectively.

As illustrated in FIGS. 10A-10D, in a first example, each of the first and second cell sheets 30 and 40 may be comprised of a formed film 110 and a lower-side film 120.

The first and second cell sheets 30 and 40 may be vertically symmetrical with respect one another, with the second cell sheet 40 positioned below the first cell sheet 30 which is in an inverted state.

FIGS. 11A-11B and 12A-12B are front views each of which schematically illustrates another example of first and second cell sheets of the second embodiment.

Figure 11A:
FIGS. 11A-11B and 12A-12B are front views each of which schematically illustrates another example of first and second cell sheets of the second embodiment.
Figure 11A:
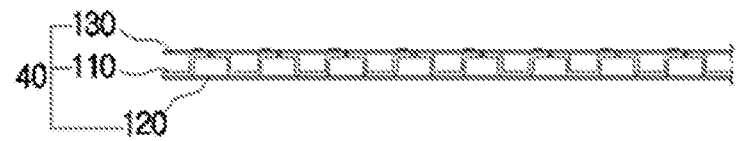
Figure 11B:
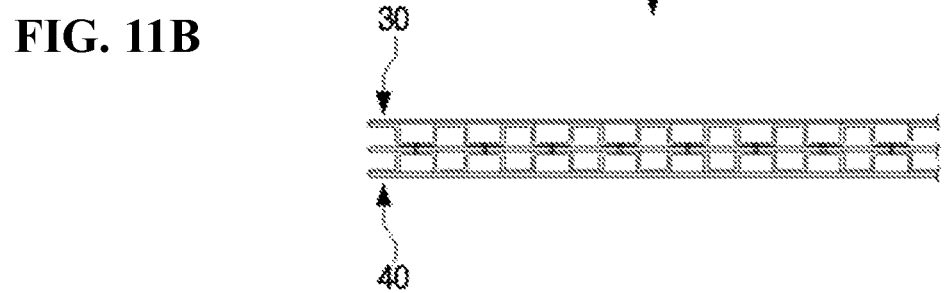

Alternatively, in a second example, as illustrated in FIGS. 11A and 11B, the first cell sheet 30 may be comprised of the formed film 110 and the lower-side film 120.

In addition, the second cell sheet 40 may be comprised of the formed film 110, the lower-side film 120, and an upper-side film 130.

The upper-side film 130 may be bonded to upper portions of the plurality of cells 100 of the formed film 110 in various methods such as fusing or adhesion.

Figure 12A:
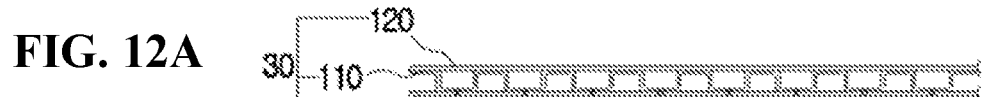
Figure 12A:
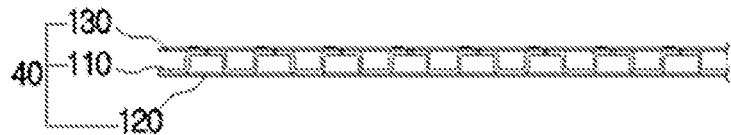
Figure 12B:
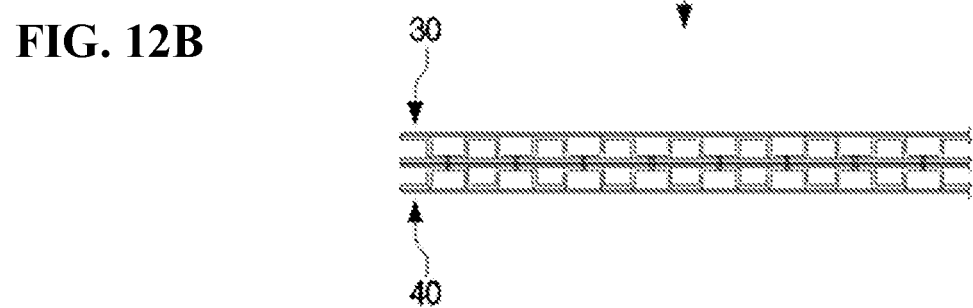

Alternatively, in a third example, as illustrated in FIGS. 12A and 12B, each of both the first cell sheet 30 and the second cell sheet 40 may be comprised of the formed film 110, the lower-side film 120, and the upper-side film 130.

The step a) of the second embodiment may also be comprised of $a_1$) adhesive applying step and $a_2$) perforating step.

In the step $a_1$) of the second embodiment, as illustrated in FIGS. 10A-10D, the adhesive 2 may be applied to one side of an upper portion or the other side of the upper portion of each of the plurality of cells 100 of the second cell sheet 40 of the first example through an adhesive applying unit 50.

Alternatively, as illustrated in FIGS. 11A-11B and 12A-12B, the adhesive 2 may be applied to a portion of the upper-side film 130, the portion being located at the one side of the upper portion or the other side of the upper portion of each of the plurality of cells 100 of the second cell sheet 40 of the second example through the adhesive applying unit 50.

Figure 13:
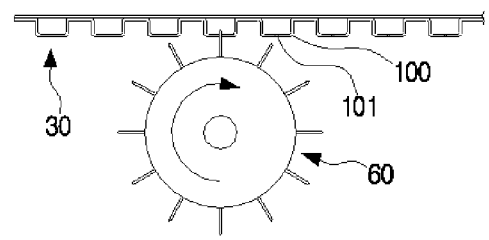
FIGS. 13 and 14 are front views schematically illustrating a process of perforating a plurality of cells of the second embodiment.
Figure 13:
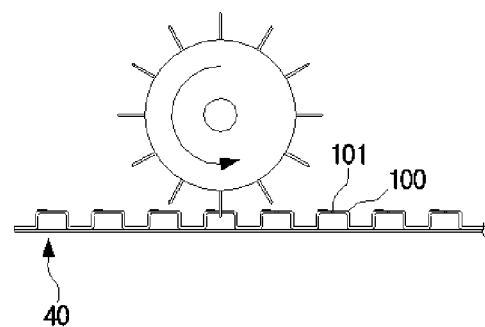
Figure 14:
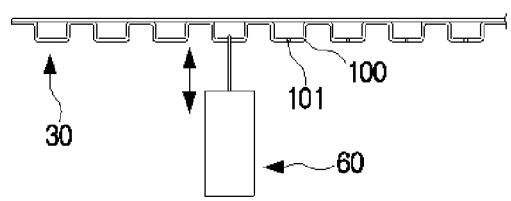
Figure 14:
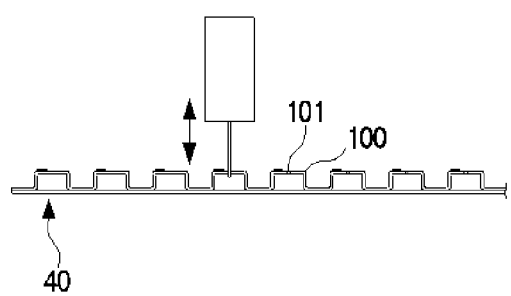

FIGS. 13 and 14 are front views schematically illustrating a process of perforating the plurality of cells of the second embodiment.

In the step $a_2$) of the second embodiment, as illustrated in FIGS. 13 and 14, perforating units 60 positioned at respective positions below the first cell sheet 30 and above the second cell sheet 40 may perforate respective central portions of the plurality of cells 100 to form holes 101 in the plurality of cells 100.

Next, step b) of the second embodiment is a step of partially bonding the first and second cell sheets 30 and 40 to each other and may be performed by allowing the first and second cell sheets 30 and 40 to pass through a pair of rotary rollers 70 so that the first and second cell sheets 30 and 40 are partially bonded to each other while the first and second cell sheets 30 and 40 are compressed.

Next, also in the second embodiment, the present invention may further include a winding step (hereinafter referred to as "step c)")

In the second embodiment, in the step c), the first and second cell sheets 30 and 40 may be wound on an outer surface of a winding roller 80.

Figure 15:
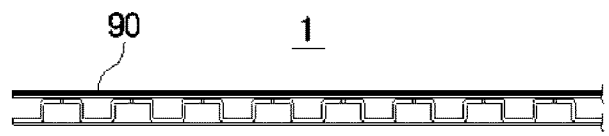
FIG. 15 is a front view schematically illustrating a state in which a cover layer is formed on a lower portion of a packaging sheet manufactured by the method of manufacturing the packaging sheet according to the first embodiment.

FIG. 15 is a front view schematically illustrating a state in which a cover layer is formed on a lower portion of a packaging sheet manufactured by the method of manufacturing the packaging sheet according to the first embodiment.

Next, as illustrated in FIG. 15, a cover layer may be provided on an upper outer surface or a lower outer surface of a packaging sheet 1 manufactured through the steps a) and b) of the method of manufacturing the packaging sheet according to each of the first and second embodiments of the present invention in various methods, such as an adhesion method.

The cover layer 90 may be configured as various types such as aluminum foil in order to reflect light that is emitted to the packaging sheet 1 to minimize generation of high temperature heat on an outer surface of the packaging sheet 1.

Alternatively, the cover layer 90 may configured as any one of a paper layer, a nonwoven fabric layer, and a fabric layer in order to further improve heat insulation efficiency of the packaging sheet 1.

Figure 16A:
FIGS. 16A-16B are front views sequentially illustrating a process of providing a check valve on the packaging sheet.
Figure 16B:

FIGS. 16A and 16B are front views sequentially illustrating a process of providing a check valve on the packaging sheet.

Next, as illustrated in FIGS. 16A and 16B, a check valve 200 may be provided between one side of the cell sheet 10 and one side of the finishing sheet 20 of the first embodiment or between the first cell sheet 30 and the second cell sheet 40 of the second embodiment in various methods such as an adhesion method or a fusion method, the cell sheet and the finishing sheet or the first cell sheet and the second cell sheet each of which constitutes the packaging sheet 1 manufactured through the steps a) and b) and unwound from the winding roller 80 to be cut to a predetermined length.

Figure 17A:
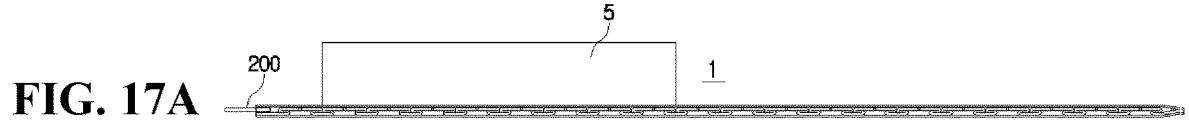
FIGS. 17A-17B are front views sequentially illustrating an example of packaging a package object with the packaging sheet.
Figure 17B:
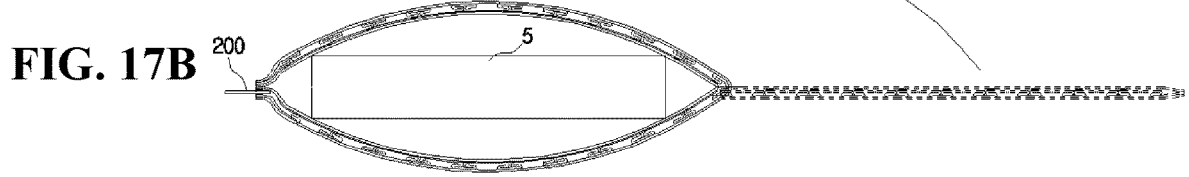

FIGS. 17A and 17B are front views sequentially illustrating an example of packaging a packaging object with the packaging sheet.

As illustrated in FIGS. 17A and 17B, the packaging sheet 1 unwound from the winding roller 80 and cut to a predetermined length may be folded, for example, in half in a state in which a packaging object 5 which may be configured as various types of foods such as vegetables is placed at one side of an upper portion of the packaging sheet 1.

One side, front side, and rear side of the packaging sheet 1 may be bonded in various methods such as adhesion or fusing in a state in which the packaging object 5 is accommodated inside the packaging sheet 1 folded in half to form a packaging bag.

Figure 18:
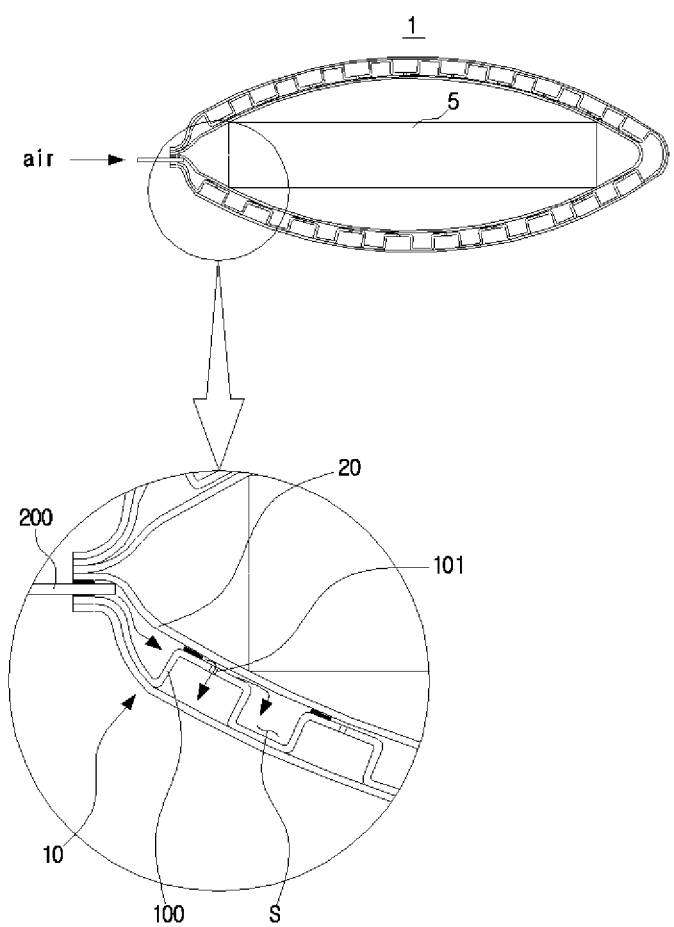
FIG. 18 is a front view schematically illustrating a process of introducing gas into the plurality of cells through the check valve.

FIG. 18 is a front view schematically illustrating a process of introducing gas into the plurality of cells through the check valve.

As illustrated in FIG. 18, gas may be injected through the check valve 200 between one side of the cell sheet 10 and one side of the finishing sheet 20 of the first embodiment or between the first cell sheet 30 and the second cell sheet 40 of the second embodiment, the cell sheet and the finishing sheet or the first cell sheet and the second cell sheet each of which constitutes the packaging sheet 1.

The gas may be configured as various types such as air or an inert gas such as nitrogen, argon, krypton, helium, neon, xenon, or radon which are stable gases that have low reactivity as well as having an excellent heat insulation property.

The gas injected between one side of the cell sheet 10 and one side of the finishing sheet 20 of the first embodiment or between the first cell sheet 30 and the second cell sheet 40 of the second embodiment, the cell sheet and the finishing sheet or the first cell sheet and the second cell sheet each of which constitutes the packaging sheet 1, may be injected into the plurality of cells 100 through the holes 101.

In addition, the gas may be injected entirely into spaces S formed between the plurality of cells 100.

In particular, since the gas is injected into the spaces S formed between the plurality of cells 100, it is possible to block heat exchange due to the spaces S, thereby preventing a heat insulation property of the packaging sheet 1 according to the present invention from decreasing.

In addition, since both the cell sheet 10 and the finishing sheet 20 of the first embodiment and the first and second cell sheets 30 and 40 of the second embodiment are laminated in a partially bonded state through the adhesive applied to the cell sheet 10 or the second cell sheet 40 at a predetermined interval in a form of a matrix, it is possible to efficiently prevent occurrence of a swelling phenomenon in which a middle portion of the packaging sheet 1 is convexly swelled during a gas injection process.

Figure 19A:
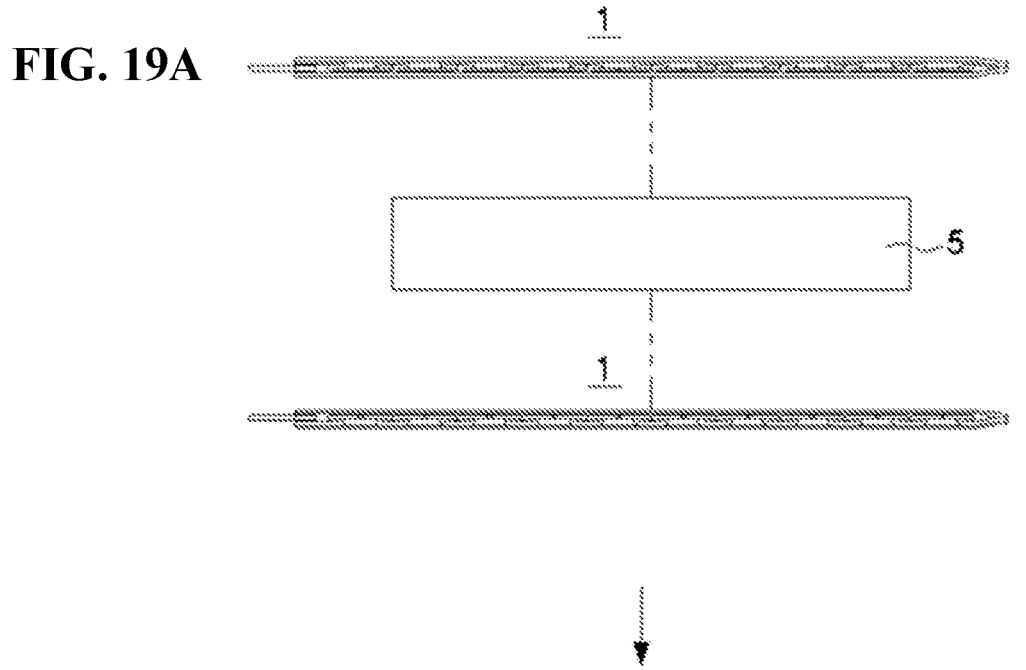
FIGS. 19A-19B are front views sequentially illustrating another example of packaging the packaging object with the packaging sheet.
Figure 19B:
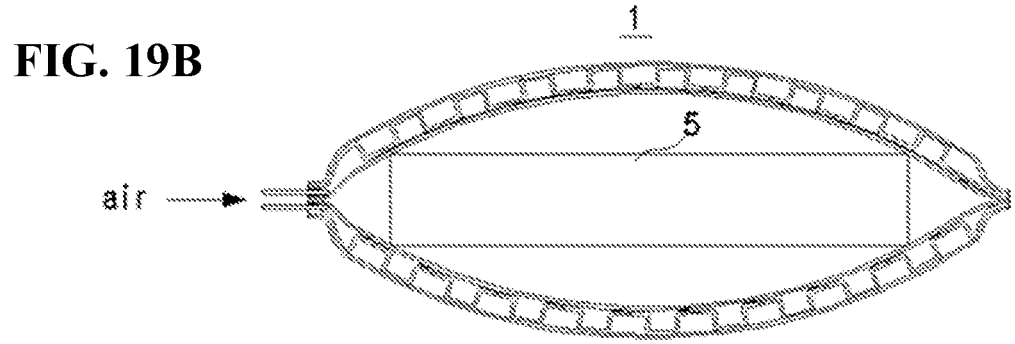

FIGS. 19A and 19B are front views sequentially illustrating another example of packaging the packaging object with the packaging sheet.

In another example, as illustrated in FIGS. 19A and 19B, in a state in which the packaging object 5 is positioned between one packaging sheet 1 and another packaging sheet 1, one side, the other side, a front side, and a rear side of the one packaging sheet 1 and one side, the other side, a front side, and a rear side of the another packaging sheet 1 may be bonded, respectively, in a state of being in contact with each other in various methods such as adhesion or fusing to form a packaging bag.

Figure 20A:
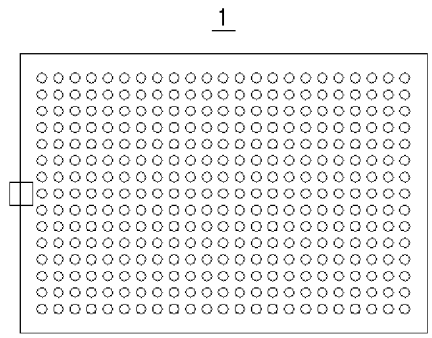
FIGS. 20A-20C are views sequentially illustrating a process of manufacturing a packaging bag or a packaging box for packaging the packaging object with the packaging sheet.
Figure 20B:
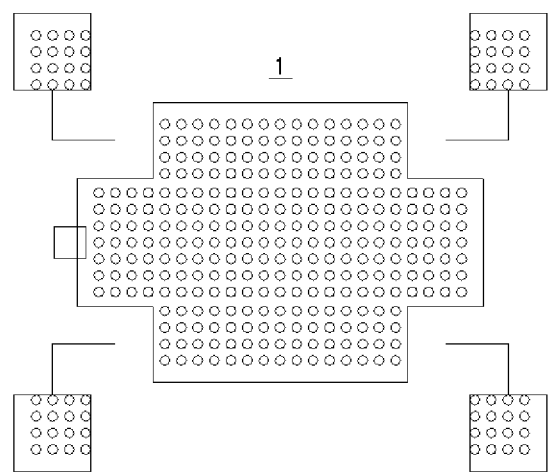
Figure 20C:
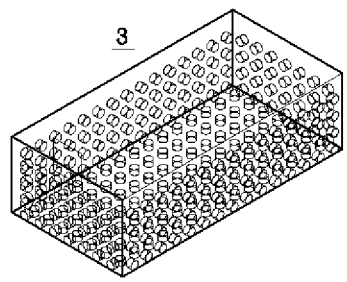

FIGS. 20A-20C are views sequentially illustrating a process of manufacturing a packaging bag or a packaging box for packaging the packaging object with the packaging sheet.

In another example, as illustrated in FIGS. 10A-10D, in order to form the packaging sheet 1 in a "+" shape, each corner portion of the rectangular packaging sheet 1 may be cut through a cutting machine or the like.

One side, the other side, a front side, and a rear side of the "+"-shaped packaging sheet 1 may be vertically folded upwardly of the packaging sheet 1 with respect to the center of the "+"-shaped packaging sheet 1 to form a packaging bag or a packaging box 3 with an open top.

Each corner portion of the packaging bag or the packaging box 3 with the open top may be bonded in various methods, such as adhesion or fusing.

Upper inner surfaces of the packaging bag or the packaging box 3 may be bonded in various methods, such as adhesion or fusing, such that the top of the packaging bag or the packaging box 3 is closed in a state in which the packaging object 5 is accommodated inside the packaging bag or the packaging box 3.

Through the method of manufacturing the packaging sheet according to each of the first embodiment and the second embodiment of the present invention, it is possible to manufacture the packaging sheet 1, an insulation material, the packaging bag, the packaging box 3, a pack with heat and cold insulation, and the like.

INDUSTRIAL APPLICABILITY

The present invention can not only greatly improve a heat insulation property of a packaging sheet, but also minimize the volume of cells of the packaging sheet without opening the cells by cutting or needle-punching the cells, thereby facilitating storage and transportation of the packaging sheets while significantly reducing logistics costs.

The invention claimed is:

1. A method of manufacturing a packaging sheet, the method comprising:
    forming a cell sheet by bonding a flat lower side film to a formed film having a plurality of cells arranged at regular intervals;
    perforating each of the plurality of cells of the cell sheet;
    partially bonding a flat finishing sheet onto the plurality of cells of the cell sheet; and
    winding the cell sheet partially bonded to the flat finishing sheet on an outer surface of a winding roller,
    wherein the perforating comprises:
        applying an adhesive to a part of each of the plurality of cells; and
        perforating a part of each of the plurality of cells where the adhesive is not applied,
    wherein the partially bonding is performed by allowing the cell sheet and the flat finishing sheet to pass through a pair of rotary rollers so that the cell sheet and the flat finishing sheet are partially bonded to each other while the cell sheet and the flat finishing sheet are compressed.

2. A method of manufacturing a packaging sheet, the method comprising:
    forming a first and a second cell sheets by bonding a flat lower side film to a formed film having a plurality of cells arranged at regular intervals;
    perforating each of the plurality of cells of each of the first and the second cell sheets;
    partially bonding the first and the second cell sheets to each other; and
    winding the bonded first and second cell sheets on an outer surface of a winding roller,
    wherein the perforating comprises:
        applying an adhesive to a part of each of the plurality of cells of each of the first and the second cell sheets; and
        perforating a part of each of the plurality of cells of each of the first and the second cell sheets where the adhesive is not applied,
    wherein the partially bonding is performed by allowing the first and the second cell sheets to pass through a pair of rotary rollers so that the first and the second cell sheets are partially bonded to each other while the first and the second cell sheets are compressed.

3. The method of claim 1, wherein the formed film is formed such that two films each comprising a plurality of grooves overlap each other in an up-and-down direction such that the plurality of cells is disposed between the two films.

4. The method of claim 2,
    wherein the first cell sheet or the second cell sheet includes:
    the formed film; and
    the flat lower-side film, and
    wherein the flat lower-side film is bonded onto a lower side of the formed film and an upper-side film is bonded onto the plurality of cells of the formed film.

5. The method of claim 2, wherein each of the first and the second cell sheets includes:
    the formed film; and
    the flat lower-side film, and
    wherein the flat lower-side film is bonded onto a lower side of the formed film and an upper-side film is bonded onto the plurality of cells of the formed film.

6. The method of claim 1, wherein the perforating is performed by perforating each of the plurality of cells through a perforating unit, the perforating unit including:
    a rotary roller; and
    a plurality of needle bars that are formed on an outer surface of the rotary roller at regular intervals and each of which is configured to perforate the part of each of the plurality of cells where the adhesive is not applied while rotating together with the rotary roller.

7. The method of claim 1, wherein the perforating is performed by perforating each of the plurality of cells through a perforating unit, the perforating unit including:
    a needle bar configured for perforating the part of each of the plurality of cells where the adhesive is not applied.

* * * * *